United States Patent
Fumia, Jr.

[11] 3,880,844
[45] Apr. 29, 1975

[54] PHOTOGRAPHIC SENSITIZING DYES CONTAINING A BRIDGEHEAD NITROGEN

[75] Inventor: Arthur Fumia, Jr., Hilton, N.Y.

[73] Assignee: Eastman Kodak Company, Rochester, N.Y.

[22] Filed: Mar. 20, 1973

[21] Appl. No.: 343,062

Related U.S. Application Data

[62] Division of Ser. No. 234,389, March 13, 1972, Pat. No. 3,772,034.

[52] U.S. Cl. .............. 260/240.4; 96/132; 96/133; 96/135; 96/136; 96/141; 260/240.6; 260/240.65; 260/283 SY; 260/286 R; 260/289 R; 260/296 T; 260/297 T; 260/326.5

[51] Int. Cl............................................. C09b 23/10
[58] Field of Search......... 260/240.4, 240.6, 240.65, 260/240.7; 96/129, 131, 132, 135

[56] References Cited
UNITED STATES PATENTS

| | | | |
|---|---|---|---|
| 3,384,486 | 5/1968 | Taber et al. ................. | 260/240.4 X |
| 3,384,489 | 5/1968 | Lincoln et al. ............... | 260/240.4 X |
| 3,397,981 | 8/1968 | Lincoln et al. ............... | 260/240.4 X |
| 3,403,026 | 9/1968 | Oliver ........................ | 260/240.4 X |
| 3,408,195 | 10/1968 | Oliver ........................ | 96/136 X |
| 3,557,100 | 1/1971 | Freed et al. ................. | 260/240 R |
| 3,772,034 | 11/1973 | Fumia ......................... | 96/136 |
| 3,772,278 | 11/1973 | Jeffreys et al. ............... | 260/240.4 |

OTHER PUBLICATIONS

Hamer, The Cyanine Dyes and Related Compounds, pp. 275 to 277, Interscience Publishers, a John Wiley and Sons Division (N.Y.), 1964.
Chemical Abstracts, Vol. 68, Abstract No. 38645d (1968), (abst. of Meyers et al.).
Eastman Kodak Research Disclosure, Sept. 1972, pages 52 to 54.

*Primary Examiner*—John D. Randolph
*Attorney, Agent, or Firm*—M. R. Chipaloski

[57] ABSTRACT

Cyanine and merocyanine photographic sensitizing dyes containing a bridgehead nitrogen atom are provided. These dyes include those represented by the formulas

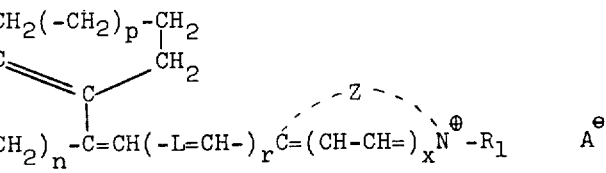
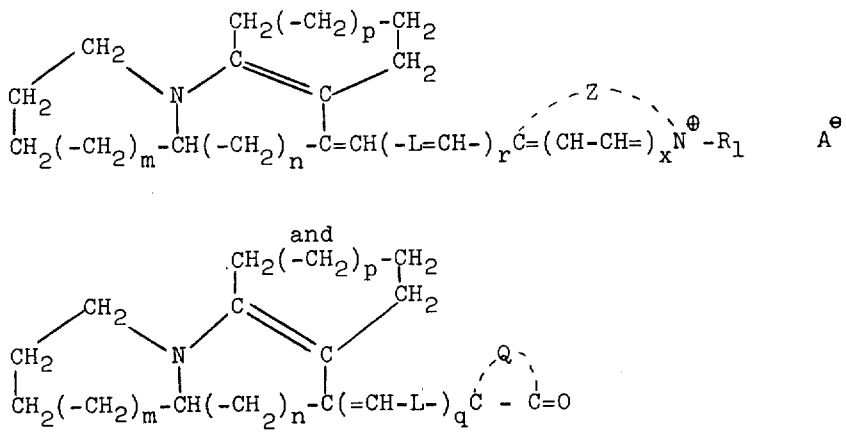
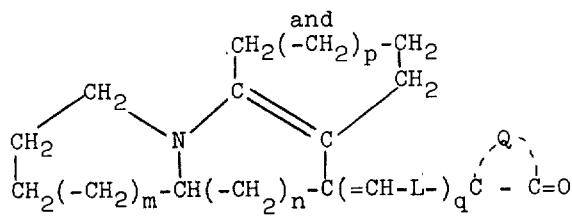

wherein $m$, $n$, $p$ and $x$ each has a value of 0 or 1, $r$ and $q$ each have a value of 0, 1, 2 or 3, L is a methine group, Z represents the nonmetallic atoms necessary to complete a heterocyclic nucleus containing 5 to 6 atoms in the heterocyclic ring, $R_1$ represents a lower alkyl group or an aryl group, A represents an anion and Q represents the nonmetallic atoms necessary to complete a heterocyclic nucleus containing 5 or 6 atoms in the heterocyclic ring.

Light sensitive silver halide emulsions containing such dyes are also provided.

7 Claims, No Drawings

PHOTOGRAPHIC SENSITIZING DYES CONTAINING A BRIDGEHEAD NITROGEN

This is a division of application Ser. No. 234,389, filed Mar. 13, 1972 now U.S. Pat. No. 3,772,034

This invention relates to photographic sensitizing dyes and, more particularly, to cyanine and merocyanine dyes which are useful in the preparation of photographic silver halide emulsions.

Certain dyes of the cyanine and merocyanine dye class are known to extend the sensitivity of photographic silver halide emulsion layers. It is an object of this invention to provide a new class of cyanine and merocyanine dyes which are valuable for sensitizing photographic silver halide emulsions. It is another object of this invention to provide photographic silver halide emulsions containing new dyes. It is a further object of this invention to provide photographic elements containing new photographic emulsions.

These and other objects are accomplished by the practice of this invention, which, briefly, comprises providing cyanine and merocyanine dyes derived from enamino ketones, or alkoxy derivatives thereof containing a bridgehead nitrogen. These new dyes are represented by the following formulas:

I. 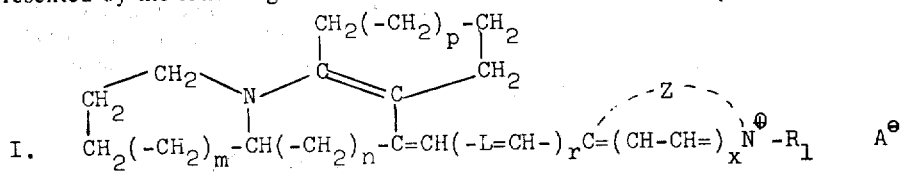

and

II. 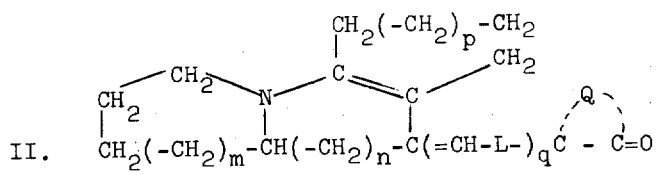

wherein $m$, $n$, $p$ and $x$ each has a value of 0, 1, 2, 3; $r$ and $q$ each have a value of 0, 1 or 2; L represents a methine group; Z represents the nonmetallic atoms necessary to complete a heterocyclic nucleus containing from 5 to 6 atoms in the heterocyclic ring, such as a heterocyclic nucleus of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dihydroxymethylenebenzothiazole, 5-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 7-methoxy-α-naphthothiazole, 8-methoxy-β-naphthothiazole, etc.), those of the thionaphtheno-7′6′,4,5-thiazole series (e.g., 4′-methoxythionaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3,3-dialkylindolenine series (e.g., 3,3-dimethylindolenine, 3,3,5-trimethylindolenine, 3,3,7-trimethylindolenine, etc.) those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), those of the imidazole series (e.g., imidazole, 4-methylimidazole, 5-ethylimidazole, 4-chloroimidazole, 4,5-dichloroimidazole, 4-methoxyimidazole, 5-phenylimidazole, etc.), those of the benzimidazole series (e.g., benzimidazole, 4-methylbenzimidazole, 5-methylbenzimidazole, 6- methylbenzimidazole, 5,6-dichlorobenzimidazole, 5-chlorobenzimidazole, 5-phenylbenzimidazole, 6-phenylbenzimidazole, etc.), those of the naphthimidazole series (e.g., α-naphthimidazole, β-naphthimidazole, etc.), those of the lepidine series (e.g., lepidine, 7-chlorolepidine, 7-methyllepidine, etc.); $R_1$ preferably represents a lower alkyl group having 1 to 8 carbon atoms such as methyl, ethyl, propyl, butyl, etc., and including substituted lower alkyl groups such as carboxyalkyl group (e.g., carboxymethyl, carboxyethyl, carboxypropyl, carboxybutyl, etc.), a carbalkoxyalkyl group (e.g., carbomethoxymethyl, carbethoxyethyl, carbopropoxyethyl, carbopropoxybutyl, etc.), a sulfoalkyl group (e.g., sulfomethyl, sulfoethyl, sulfopropyl, sulfobutyl, etc.), a hydroxyalkyl group (e.g., hydroxymethyl, hydroxyethyl, hydroxypropyl, hydroxybutyl, etc.), and alkoxyalkyl group (e.g., methoxyethyl, methoxypropyl, ethoxyethyl, ethoxypropyl, etc.), a sulfoalkoxyalkyl group, as well as an aryl group such as phenyl, 4-methylphenyl, 4-chlorophenyl, etc.; $A^-$ represents an anion such as chloride, bromide, iodide, p-toluenesulfonate, thiocyanate, perchlorate, acetate, methylsulfate, ethylsulfate, etc.; Q represents the nonmetallic atoms necessary to complete a heterocyclic nucleus containing 5 or 6 atoms in the heterocyclic ring, such as heterocyclic nucleus of the 2-pyrazolin-5-one series (e.g., 3-methyl-1-phenyl-2-pyrazolin-5-one, 3-ethyl-1-phenyl-2-pyrazolin-5-one, 3-phenyl-1-methyl-2-pyrazolin-5-one, etc.), a heterocyclic nucleus of the indandione series (e.g., 1,3-diketohydrindene, etc.), those of the 2,4,6-triketohexahydropyrimidine or 2,6-diketo-4-thiohexahydropyrimidine series (e.g., barbituric acid or 2-thiobarbituric acid) as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-dicyclohexyl, etc.) or 1,3-diaryl (e.g., 1,3-diphenyl, 1,3-di(p-chlorophenyl), etc.), or 1-aryl (e.g., 1-phenyl, 1-p-chlorophenyl, 1-p-ethoxycarbonylphenyl, etc.), or 1-alkyl-3-aryl (e.g., 1-ethyl-3-phenyl, 1-n-heptyl-3-phenyl, etc.) derivatives, etc.; a heterocyclic nucleus of the rhodanine series (e.g., rhodanine, 3-ethylrhodanine, 3-propylrhodanine, 3-butylrhodanine, 3-(p-carboxyphenyl)rhodanine, 3-(p-sulfophenyl)rhodanine, etc.), a heterocyclic nucleus of the hydantoin series (e.g., hydantoin, 1-(p-carboxyphenyl)-3-phenylhydantoin, 1-ethyl-3-phenylhydantoin, etc.), a heterocyclic nucleus of the thiohydantoin series (e.g., 2-thiohydantoin, 1-p-carboxyphenyl-3-phenyl-2-thiohydantoin, 1-p-sulfophenyl-3-phenyl-2-thiohydantoin, 1-ethyl-3-phenyl-2-thiohydantoin, etc.), a heterocyclic nucleus of the 2-thio-2,4-oxazolidinedione series (e.g., 2-thio-2,4-oxazolidinedione, 3-(p-sulfophenyl)-2-thio-2,4-oxazolidinedione, 3-ethyl-2-thio-2,4-oxazolidinedione, etc.).

Compounds I and II can be prepared from enamino ketones, or ether derivatives thereof, containing bridgehead nitrogen. Such intermediates can be represented by the formulas III. 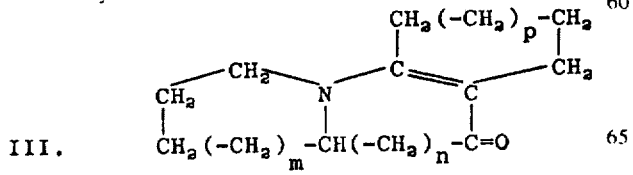 and IV. 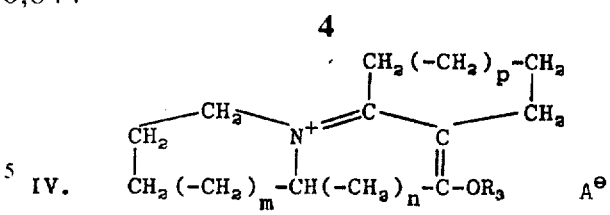 $A^\ominus$ wherein $m$, $n$ and $p$ are as previously defined; $R_3$ is a lower alkyl group sugh as methyl, ethyl, propyl, and $A^-$ is an anion such as $BF_4^-$, $CLO_4^-$, etc. The intermediates of Compound III can be prepared by the cyclization of enamines derived from β-aminoesters and β-aminonitriles. Thus, the compound 1,2,3,4,5,5a,6,7,8,9-decahydrocyclopenta[c]quinolizin-4-one (m.p. 67°-68°C.) having the formula

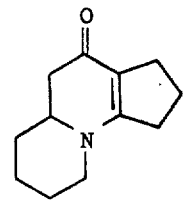

can be prepared by heating ethyl 2-piperidylacetate and cyclopentanone according to the procedure described by Myer et al, J. Heterocyclic Chemistry, Vol. 5, pages 151–159 (1968). In a similar manner, the compound 2,3,4,4a,5,6,7,8,9,10-decahydro-1H-benzo[c]quinolizin-6-one (m.p. 77°-78°C. C.) having the formula

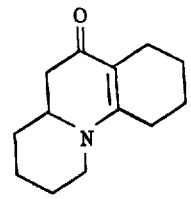

can be prepared by heating ethyl 3-piperidylacetate and cyclohexanone; and 2,3,3a,4,5,6,7,8-octahydro-1H-cyclopenta[e]-indolizin-5-one (m.p. 97°-98°C.) having the formula

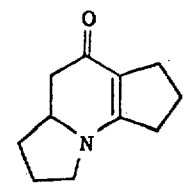

can be prepared by condensing ethyl-2-pyrrolidinylacetate and its acetate salt with cyclopentanone. Ethyl-2-pyrrolidinylacetate and its acetate salt can be prepared by the hydrogenation of ethyl-2-pyrrolylacetate having the formula

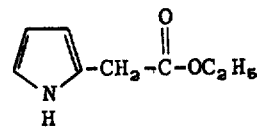

according to the procedure described by Adams et al, J.A.C.S., Vol. 83, page 3323 (1961). The compound

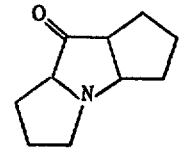

can be pared by condensing cyclopentanone with ethyl- 2-pyrrolidinyl formate.

The intermediates of Compound IV can be prepared by heating a mixture of a compound of Compound III and triethyloxonium fluoborate in an inert solvent. Thus, 4-ethoxy-2,3,5,5a,6,7,8,9-octahydro-1H-cyclopenta[c]quinolizinium fluoborate,

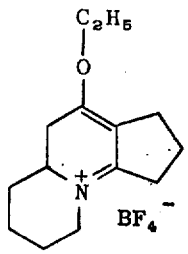

can be prepared as follows:

1,2,3,4,5a,6,7,8,9-Decahydrocyclopenta[c]quinolizin-4-one (9.55 g.) and triethyloxonium fluoborate (9.50 g.) are dissolved in dichloromethane (10 ml.) and heated at reflux for 15 minutes. After chilling, the mixture is diluted to about 400 ml. with ether and chilled further. The solid product is then collected on a filter and dried in a vacuum oven at 60 C. to yield 14.87 g. (97%), m.p. 63°–65°C.

In the same manner, 6-ethoxy-1,2,3,4,4a,5,6,7,8,9,10-decahydro[c]quinolizinium fluoborate,

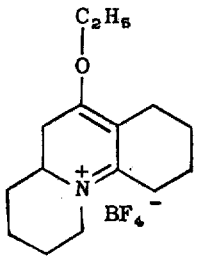

can be prepared by condensing 2,3,4,4a,5,6,7,8,9,10-decahydro-1H-benzo[c]quinolizin-6-one with triethyloxonium fluoborate.

The cyanine dyes of Formula I (p= 0) can be conveniently prepared by heating a mixture of a compound of Compounds III or IV with a nitrogen-containing heterocyclic compound containing a reaction methyl group having the formula

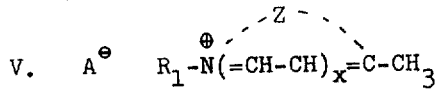

V.  $A^\ominus$   $R_1-N(=CH-CH)_x=C-CH_3$ wherein $R_1$, A, Z and $x$ are as previously defined. When the intermediate of Compound III is employed, the reaction is preferably conducted in acetic anhydride. When the intermediate of Compound IV is employed, the reaction is preferably conducted in an inert solvent, such as pyridine, quinoline, isoquinoline, ethanol, n-propanol, n-butanol, etc., and in the presence of a basic condensing agent such as the trialkyl amines (e.g., triethylamine, tri-n-propylamine, tri-n-butylamine, etc.), N-methylpiperidine, N-ethylpiperidine, N,N-dimethylaniline, etc.

The merocyanine dyes of Formula II (q=0) can be conveniently prepared by heating a mixture of a compound of Compound IV with a nitrogen-containing heterocyclic compound containing a reactive methylene group having the formula

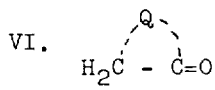

VI.

wherein Q is as previously defined. The reaction is preferably conducted in an inert solvent such as pyridine, quinoline, isoquinoline, ethanol, n-propanol, n-butanol, etc. and in the presence of a basic condensing agent such as the trialkyl amines (e.g., triethylamine, tri-n-propylamine, tri-n-butylamine, etc.), N-methylpiperidine, N-ethylpiperidine, N,N-dimethylaniline, etc.

The longer chain cyanine and merocyanine dyes can be prepared from Compound VII below which in turn can be prepared from Compound IV by the methods disclosed in Examples 2-4 and lines 8-29, Column 4 of U.S. Pat. No. 3,440,052. Compound VII can be converted to Compound VIII below by methods well known in the art utilizing, for example, diphenylformamidine, β-anilinoacrolein, anil hydrochloride, or glutaconaldehyde dianil hydrochloride. Dyes of the invention can then be prepared by reacting Compound VIII with Compound V or Compound VI. Symmetrical cyanine dyes can also be made by reacting Compound VII with such compounds as ethyl orthoformate, ethylorthopropionate, trimethoxypropene or glutaconaldehyde dianil hydrochloride.

VII.
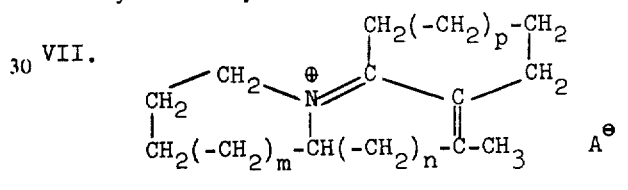

VIII.
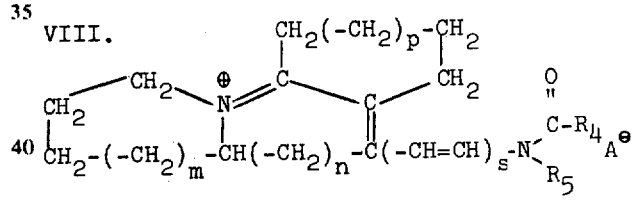

wherein $s$ is an integer of 1 to 3; $R_4$ is an alkyl or an aryl group and $R_5$ is an aryl group.

Typical longer chain cyanine and merocyanine dyes include:

2-[3-(2,3,4,4a,5,6,7,8,9,10-Decahydro 1H-benzo[e]quinolizin-6-ylidene)propenyl]-3-ethylbenzoxazolium iodide 2-[5-(2,3,4,4a,5,6,7,8,9,10-Decahydro-1H-benzo[e]quinolizin-6-ylidene)-1,3-pentadienyl]-3-ethyl benzothiazolium iodide 5-[2,3,4,4a,5,6,7,8,9,10-Decahydro-1H-benzo[e]quinolizin-6-ylidene)ethylidene]-3-ethylrhodanine

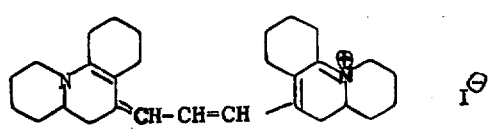

(1,2,3,4,4a,5,7,8,9,10-Decahydrobenzo[e]-quinolizino)carbocyanine iodide.

The alkyl groups or moieties referred to herein typically have 1 to 20 carbon atoms, lower alkyl radicals or moieties have 1 to 8 carbon atoms and aryl groups or moieties typically include phenyl and naphthyl.

The new dyes of this invention are excellent spectral and chemical sensitizers for photographic silver halide emulsions and particularly for negative silver halide systems. The silver halide emulsions which can be spectrally sensitized by the dyes of this invention can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal*, Vol. LXXIX, May 1939 (pp. 330-338), double jet emulsions such as Lippmann emulsions, ammoniacal emulsions, thiocyanate or thioether ripened emulsions such as those described in Neitz et al. U.S. Pat. No. 2,222,264 issued Nov. 19, 1940; Illingsworth U.S. Pat. No. 3,320,069 issued May 17, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al. U.S. Pat. No. 2,592,250 issued May 8, 1952; Porter et al. U.S. Pat. No. 3,206,313 issued Sept. 14, 1965; Berriman U.S. Pat. No. 3,367,778 issued Feb. 6, 1968 and Bacon et al. U.S. Pat. No. 3,447,927 issued June 3, 1969. If desired, mixtures of such surface and internal image-forming emulsions can be made, such being described in Luckey et al. U.S. Pat. No. 2,996,382 issued Aug. 15, 1961. Silver halide emulsions can be regular grain emulsions such as the type described in Klein and Moisar, *J. Phot. Sci.*, Vol 12, No. 5, Sept./Oct., 1964, pp. 242-251. Negative type emulsions can be made, as well as direct positive emulsions as described in Leermakers U.S. Pat. No. 2,184,013 issued Dec. 19, 1939; Kendall et al. U.S. Pat. No. 2,541,472 issued Feb. 13, 1951; Schouwenaars British Pat. No. 723,019 issued Feb. 2, 1955; Illingsworth et al. French Pat. No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al. U.S. Pat. No. 2,456,953 issued Dec. 21, 1948 and Land U.S. Pat. No. 2,861,885 issued Nov. 25, 1958.

The silver halide emulsions can be unwashed or washed to remove soluble salts after precipitation of the silver halide. In the latter case, the soluble salts can be removed by chill-setting and leaching or the emulsion can be coagulation washed, e.g., by the procedures described in Hewitson et al. U.S. Pat. No. 2,618,556 issued Nov. 18, 1952; Yutzy et al. U.S. Pat. No. 2,614,928 issued Oct. 21, 1952; Yackel U.S. Pat. No. 2,565,418 issued Aug. 21, 1951; Hart et al. U.S. Pat. No. 3,241,969 issued Mar. 22, 1966 and Waller et al. U.S. Pat. No. 2,489,341 issued Nov. 29, 1949.

The dyes of this invention are advantageously incorporated in the washed, finished emulsion and should be uniformly distributed throughout the emulsion. The dyes can be added from solutions in appropriate solvents which are compatible with the emulsion and which are substantially free from deleterious effects on the light sensitive materials.

The types of silver halide emulsions that can be sensitized with the new dyes of this invention include those prepared with hydrophilic colloids that are known to be satisfactory vehicles for dispersed silver halides, for example, emulsions comprising both naturally occurring substances such as proteins, for example, gelatin, gelatin derivatives, cellulose derivatives, polysaccharides such as dextran, gum arabic and the like; and synthetic polymeric substances such as water soluble polyvinyl compounds like poly-(vinylpyrrolidone), acrylamide polymers and the like. The photographic emulsions can also contain along or in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al., U.S. Pat. No. 3,062,674 issued Nov. 6, 1962; Houch et al. U.S. Pat. No. 3,220,844 issued Nov. 30, 1965; Ream et al. U.S. Pat. No. 3,287,289 issued Nov. 22, 1966; and Dykstra U.S. Pat. No. 3,411,911 issued Nov. 19, 1968. Other vehicle materials include water-insoluble polymers of alkyl acrylates and methacrylates, acrylic acid, sulfoalkyl acrylates or methacrylates, those which have cross-linking sites which facilitate hardening or curing as described in Smith U.S. Pat. No. 3,488,708 issued Jan. 6, 1970, and those having recurring sulfobetaine units as described in Dykstra Canadian Pat. No. 774,054.

The concentration of the new dyes in the emulsion can vary widely, e.g., from about 25 to 1,000 mg. per mole of silver halide in the emulsion. The specific concentration will vary according to the type of light-sensitive material in the emulsion and the effects desired. The suitable and most economical concentration for a given emulsion will be apparent to those skilled in the art upon making the test and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 25 to 1,000 mg. of dye is slowly added to one mole of silver halide in a gelatin-silver halide emulsion. With most of the dyes, 100 to 300 mg. of dye per mole of silver halide suffices to produce the maximum sensitizing effect with the ordinary gelatin-silver bromide (including bromoiodide and chlorobromide) emulsions. With fine grain emulsions, which include most of the ordinarily employed gelatin-silver chloride emulsions, somewhat larger concentrations of dye may be necessary to obtain the optimum sensitizing effect. While this procedure has dealt with emulsions comprising gelatin, it will be appreciated that these remarks apply generally to any emulsion wherein all or part of the gelatin is substituted by another suitable hydrophilic colloid as mentioned above.

Photographic silver halide emulsions containing the sensitizing dyes of this invention can also contain other addenda such as chemical sensitizers, e.g., reducing agents; sulfur, selenium or tellurium compounds; gold, platinum or palladium compounds; or combinations of these. Procedures for chemically sensitizing silver halide emulsions are described in Sheppard et al. U.S. Pat. No. 1,623,499 issued Apr. 5, 1927; Waller et al. U.S. Pat. No. 2,399,083 issued Apr. 23, 1946; McVeigh U.S. Pat. No. 3,297,477 issued Jan. 10, 1967 and Dunn U.S. Pat. No. 3,297,446 issued Jan. 10, 1967. The emulsions can contain development modifiers that function as speed increasing compounds such as polyalkylene glycols, cationic surface active agents and thioethers or combinations of these as described in Piper U.S. Pat. No. 2,866,437 issued May 12, 1959; Dann et al. U.S. Pat. No. 3,046,900 issued July 12, 1960 and Goffe U.S. Pat. No. 3,294,540 issued Dec. 27, 1966.

The silver halide emulsions can be protected against the production of fog and can be stabilized against loss of sensitivity during keeping. Useful antifoggants and stabilizers, each used alone, or in combination, include: (a) thiazolium salts described in Brooker et al. U.S. Pat. No. 2,131,038 issued Sept. 27, 1938 and Allen et al. U.S. Pat. No. 2,694,716 issued Nov. 16, 1954; (b) the azaindenes described in Piper U.S. Pat. No. 2,886,437 issued May 12, 1959 and Heimbach et al. U.S. Pat. No. 2,444,605 issued July 6, 1948; (c) the mercury salts as described in Allen et al. U.S. Pat. No. 2,728,663 issued Dec. 27, 1955; (d) the urazoles described in Anderson et al. U.S. Pat. No. 3,287,135 issued Nov. 22, 1966; (e) the sulfocatechols described in Kennard et al. U.S. Pat. No. 3,236,652 issued Feb. 22, 1966; (f) the oximes described in Carrol et al. British Pat. No. 623,448 issued May 18, 1949; (g) nitron; (h) nitroindazoles; (i) the mercaptotetrazoles described in Kendall et al. U.S. Pat. No. 2,403,927 issued July 16, 1946; Kennard et al. U.S. Pat. No. 3,266,897 issued Aug. 16, 1966; and Luckey et al. U.S. Pat. No. 3,397,987 issued Aug. 20, 1968; (j) the polyvalent metal salts described in Jones U.S. Pat. No. 2,839,405 issued June 17, 1958; (k) the thiuronium salts described in Herz et al. U.S. Pat. No. 3,220,839 issued Nov. 30, 1965; and (l) the palladium, platinum and gold salts described in Trivelli et al. U.S. Pat. No. 2,566,263 issued Aug. 28, 1951; and Yutzy et al. U.S. Pat. No. 2,597,915 issued May 27, 1952.

The photographic silver halide emulsions of this invention can be coated on a wide variety of supports. Typical supports include cellulose nitrate film, cellulose acetate film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

Photographic elements having silver halide emulsions coated thereon can contain developing agents such as hydroquinones, catechols, aminophenols, 3-pyrazolidones, ascorbic acid and its derivatives, reductones and phenylenediamines. Combinations of developing agents can also be employed. The developing agents can be in a silver halide emulsion and/or in another suitable location in the photographic element. The developing agents can be added from suitable solvents or in the form of dispersions as described in Yackel U.S. Pat. No. 2,592,368 issued Apr. 8, 1952 and Dunn et al. French Pat. No. 1,505,778. The emulsion layers can be hardened by various organic or inorganic hardeners, alone or in combination, such as those disclosed in Mees and James, *The Theory of the Photographic Process* pp. 54–60, 3rd Ed., MacMillan. Typical useful hardeners include the aldehydes, and blocked aldehydes as described in Allen et al. U.S. Pat. No. 2,232,764 issued Feb. 1, 1966; ketones, carboxylic and carbonic acid derivatives; sulfonate esters; sulfonyl halides; vinyl sulfonyl esters as described in Burness et al. U.S. Pat. No. 2,539,644 issued Nov. 10, 1970; active halogen compounds; epoxy compounds; aziridines; active olefins; isocyanates; carbodiimides; chlorotriazines as disclosed in Yamamoto et al. U.S. Pat. No. 3,325,287 issued June 13, 1967; Oishi et al. U.S. Pat. No. 3,362,827 issued Jan. 9, 1968, Nishio et al. U.S. Pat. No. 3,394,006 issued July 23, 1968 and Meckl et al. U.S. Pat. No. 3,549,377 issued Dec. 22, 1970; polymeric hardeners such as oxidized polysaccharides like dialdehyde starch and oxyguargum; and the like.

The layers present in photographic elements made according to this invention may also contain color-forming couplers such as those described by Schneider, Frolich and Schultze, *Die Chemie* 57, 113 (1944); in Frolich et al. U.S. Pat. No. 2,376,679 issued May 22, 1945; Jelley et al. U.S. Pat. No. 2,322,027 issued June 15, 1943; Salminen et al. U.S. Pat. No. 2,423,730 issued July 8, 1947; Weissberger et al. U.S. Pat. No. 2,474,293 issued June 28, 1949; Loria et al. U.S. Pat. No. 2,600,788 issued June 17, 1952; Salminen et al. U.S. Pat. No. 2,772,162 issued Nov. 27, 1956; Fierke et al. U.S. Pat. No. 2,801,171 issued July 30, 1957; Godowsky U.S. Pat. No. 2,698,794 issued Jan. 4, 1955; McCrossen et al. U.S. Pat. No. 2,875,057 issued Feb. 24, 1959; Salminen et al. U.S. Pat. No. 2,895,826 issued July 21, 1959; Bush et al. U.S. Pat. No. 2,908,573 issued Oct. 13, 1959; Beavers U.S. Pat. No. 2,983,608 issued May 9, 1961; Gledhill et al. U.S. Pat. No. 3,034,892 issued May 15, 1962; Barr et al. U.S. Pat. No. 3,227,554 issued Jan. 4, 1966; Weissberger et al. U.S. Pat. No. 3,062,653 issued Nov. 6, 1962; Weissberger et al. U.S. Pat. No. 3,265,506 issued Aug. 9, 1966; Loria U.S. Pat. No. 3,408,194 issued Oct. 29, 1968; Lestina U.S. Pat. No. 3,519,429 issued July 7, 1970; Graham et al. U.S. Pat. No. 3,046,129 issued July 24, 1962; Vittum et al. U.S. Pat. No. 2,360,290 issued Oct. 10, 1944; and Thirtle et al. U.S. Pat. No. 2,701,197 issued Feb. 1, 1955.

The photographic layers of this invention may also include other addenda known to be beneficial in photographic emulsions. Thus, they can contain plasticizers and lubricants such as polyalcohols, e.g., glycerin and diols of the type described in Milton et al. U.S. Pat. No. 2,960,404 issued Nov. 1, 1966; fatty acids or esters such as those described in Robijns U.S. Pat. No. 2,588,765 issued Apr. 11, 1952, and Duane U.S. Pat. No. 3,121,060 issued Feb. 11, 1964; and silicone resins such as those described in DuPont British Pat. No. 955,061 issued Apr. 15, 1964.

The layers can contain surfactants such as saponin; anionic compounds such as the alkyl aryl sulfonates described in Baldsiefen U.S. Pat. No. 2,600,831 issued Jun. 17, 1952; amphoteric compounds such as those described in Ben-Ezra U.S. Pat. No. 3,133,816 issued May 10, 1964; and water soluble adducts of glycidol and an alkyl phenol such as those described in Olin Mathieson British Pat. No. 1,022,878 issued Mar. 16, 1966; and Knox U.S. Pat. No. 2,514,293 issued May 26, 1970. Matting agents can also be included such as starch, titanium dioxide, zinc oxide, silica, polymeric beads including beads of the type described in Jelley et al. U.S. Pat. No. 2,992,101 issued July 11, 1961 and Lynn U.S. Pat. No. 2,701,245 issued Feb. 1, 1955; and alkali soluble polymeric particles of the type described in Jelley et al. U.S. Pat. No. 2,992,101. The photographic elements can contain brightening agents including stilbenes, triazines, oxazoles and coumarin brightening agents. Water soluble brightening agents can be used such as those described in Albers et al. German Pat. No. 972,067 issued May 14, 1959 and McFall et al., U.S. Pat. No. 2,933,390 issued Apr. 19, 1960; or dispersions of brighteners can be used such as those described in Jansen German Pat. No. 1,150,274 issued June 12, 1963; Oetiker et al. U.S. Pat. No. 3,406,070 issued Oct. 15, 1968; and Heidke French Pat. No. 1,530,244.

Various layers of a photographic element, including light sensitive layers, can contain light absorbing materials and filter dyes such as those described in Sawdey et al. U.S. Pat. No. 2,739,971 issued Mar. 27, 1956; Heller et al. U.S. Pat. No. 3,004,896 issued Oct. 17, 1961; Sawdey U.S. Pat. No. 3,250,617 issued May 10, 1966; Sawdey U.S. Pat. No. 3,253,921 issued May 31, 1966; Gaspar U.S. Pat. No. 2,274,782 issued Mar. 3, 1942; Silberstein et al. U.S. Pat. No. 2,527,583 issued Oct. 31, 1950; and VanCampen U.S. Pat. No. 2,956,879 issued Oct. 18, 1960. If desired, the dyes can be mordanted, for example, as described in Jones et al. U.S. Pat. No. 3,282,699 issued Nov. 1, 1966.

The following examples illustrates the best modes contemplated for carrying out this invention.

EXAMPLE 1

3-Ethyl-2-(1,2,3,4,5,5a6,7,8,9-decahydrocyclopenta[c]quinolizin-4-ylidenemethyl)benzothiazolium iodide

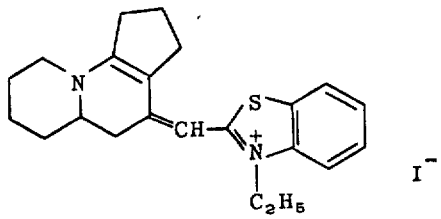

1,2,3,4,5,5a,6,7,8,9-Decahydrocyclopenta[c]quinolizin-4-one (1.91 g.) and 3-ethyl-2-methylbenzothiazolium iodide (3.05 g.) are dissolved in acetic anhydride (15.0 ml.) and heated at reflux for 2 minutes. After chilling, the crude dye is collected on a filter. After one recrystallization from methanol, the yield of purified dye is 1.49 g. (31% yield), m.p. 296°–297°C. (dec.).

EXAMPLE 2

1-Ethyl-2-(1,2,3,4,5,5a,6,7,8,9-decahydrocyclopenta[c]quinolizin-4-ylidenemethyl)naphtho[1,2-d]thiazolium iodide

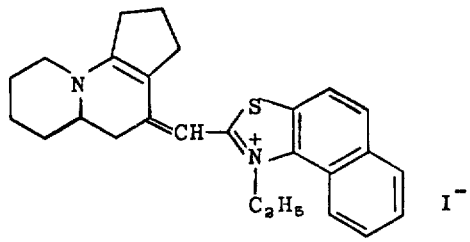

1,2,3,4,5,5a,6,7,8,9-Decahydrocyclopenta[c]quinolizin-4-one (1.91 g.) and 1-ethyl-2-methylnaphtho[1,2-d]thiazolium p-toluenesulfonate (3.99 g.) are dissolved in acetic anhydride (15.0 ml.) and heated at reflux for 2 minutes. The mixture is then poured into a beaker and treated with about 5 ml. of an aqueous solution of sodium iodide (2.0 g.). After chilling, the crude dye is collected on a filter. After one recrystallization from methanol, the yield of purified dye is 1.19 g. (33% yield), m.p. 254°–255°C. (dec.).

EXAMPLE 3

2-(1,2,3,4,5,5a,6,7,8,9-Decahydrocyclopenta[c]quinolizin-4-ylidenemethyl)-3-ethyl-5-methoxybenzothiazolium perchlorate

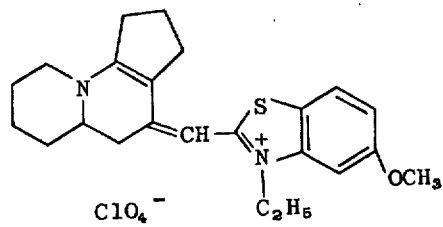

3-Ethyl-5-methoxy-2-methylbenzothiazolium p-toluenesulfonate (3.79 g.), 1,2,3,4,5,5a,6,7,8,9-decahydrocyclopenta[c]quinolizin-4-one (1.91 g.) and sodium perchlorate (1.5 g.) are dissolved in acetic anhydride (30 ml.) and heated at reflux for 5 minutes. After chilling, the crude dye is collected on a filter. After one recrystallization from methanol, the yield of purified dye is 0.97 g. (20% yield), m.p. 244°–245°C.(-dec.).

EXAMPLE 4

5-(1,2,3,4,5,5a,6,7,8,9-Decahydrocyclopenta[c]quinolizin-4-ylidene)-3-ethylrhodanine

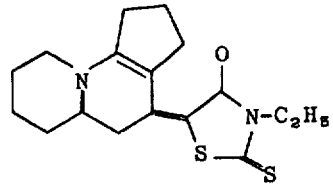

4-Ehoxy-2,3,5,5a,6,7,8,9-octahydro-1H-cyclopenta[c]-quinolizinium fluoborate (3.07 g.), 3-ethylrhodanine (1.61 g.) and triethylamine (1.5 ml.) are dissolved in ethanol (15 ml.) and heated at reflux for 5 minutes. After chilling, the crude dye is collected on a filter. After one recrystallization from ethanol, the yield of purified dye is 1.98 g. (59% yield), m.p. 153°–154°C. (dec.).

EXAMPLE 5

4-(1,2,3,4,5,5a,6,7,8,9,-Decahydrocyclopenta[c]-quinolizin-4-ylidene)-3-methyl-1-phenyl-2-pyrazolin-5-one

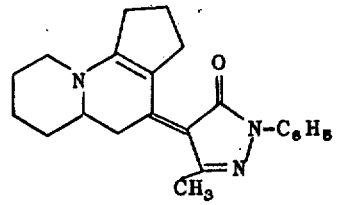

4-Ethoxy-2,3,4,5,5a,6,7,8,9-octahydro-1H-cyclopenta[c]quinolizinium fluoborate (1.54 g.), 3-methyl-1-phenyl-2-pyrazolin-5-one (0.87 g.) and triethylamine (1.0 ml.) are dissolved in ethanol (10 ml.) and heated at reflux for 5 minutes. After chilling, the crude dye is collected on a filter. After one recrystallization from methanol, the yield of purified dye is 0.76 g. (44% yield), m.p. 218°–219°C. (dec.).

EXAMPLE 6
3-Ethyl-2-(2,3,3a,4,5,6,7,8-octahydro-1H-cyclopenta[e]indolizin-5-ylidenemethyl)benzothiazolium iodide

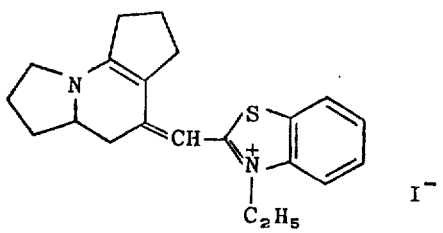

2,3,3a,4,5,6,7,8-Octahydro-1H-cyclopenta[e]indolizin-5-one (0.89 g.) and 3-ethyl-2-methylbenzothiazolium iodide (1.53 g.) are dissolved in acetic anhydride (10 ml.) and heated at reflux for 3 minutes. The solution is seeded with crystals obtained from a test tube experiment, the mixture is chilled, the crude dye is collected on a filter and recrystallized from methanol. The dye is further recrystallized from ethanol. The yield is 0.15 g. (6% yield), m.p. 304°–305°C. (dec.).

EXAMPLE 7
3-Ethyl-5-(2,3,3a,4,5,6,7,8-octahydro-1H-cyclopenta[e]indolizin-5-ylidene)rhodanine

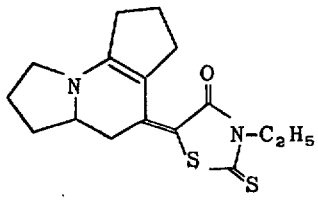

To a solution of 2,3,3a,4,5,6,7,8-octahydro-1H-cyclopenta[e]indolizin-5-one (1.49 g.) in dichloromethane (5 ml.) is added triethyloxonium fluoborate (1.60 g.), and the mixture is heated at reflux for 15 minutes. After cooling, the mixture is diluted twice with 100 ml. portions of ether and decanted. The oily residue is dissolved in ethanol (5 ml.), 3-ethylrhodanine (1.29 g.) and triethylamine (1.0 ml.) are added and the mixture is heated at reflux for 10 minutes. After chilling, the crude dye is collected on a filter and recrystallized once from ethanol. The yield is 1.13 g. (44% yield), m.p. 225°–226°C. (dec.).

EXAMPLE 8
2-(2,3,4,4a,5,6,7,8,9,10-Decahydro-1H-benzo[c]quinolizin-6-ylidenemethyl)-3-ethylnaphtho[2,3-d]thiazolium fluoborate

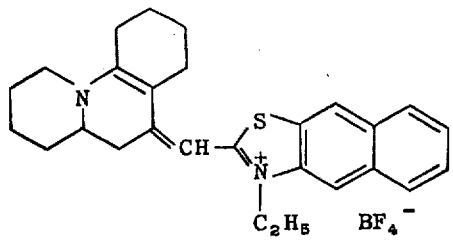

3-Ethyl-2-methylnaphtho[2,3-d]thiazolium p-toluenesulfonate (3.99 g.), 6-ethoxy-1,2,3,4,4a,5,7,8,9,10-decahydrobenzo[c]quinolizinium fluoborate (3.21 g.), and triethylamine (1.5 ml.) are dissolved in ethanol (15 ml.) and heated at reflux for 5 minutes. After chilling, the crude dye is collected on a filter. After one recrystallization from methanol, the yield of purified dye is 0.30 g. (6% yield), m.p. above 310°C.

EXAMPLE 9
1-Ethyl-2-(2,3,3a,4,5,6,7,8-octahydro-1H-cyclopenta[e]indolizin-5-ylidenemethyl)naphtho[1,2-d]thiazolium iodide

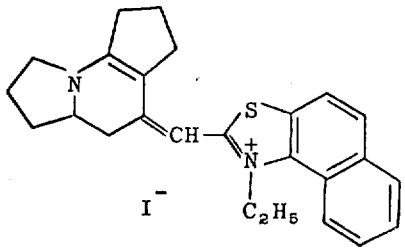

2,3,3a,4,5,6,7,8-Octahydro-1H-cyclopenta[e]indolizin-5-one (0.89 g.) and 1-ethyl-2-methylnaphtho[1,2-d]thiazolium p-toluenesulfonate (2.00 g.) are dissolved in acetic anhydride (15 ml.) and heated at reflux for 3 minutes. The reaction mixture is treated with about 1.0 g. of sodium iodide in 2 ml. of water and then chilled. The crude dye is collected on a filter. After one recrystallization from ethanol, the yield of purified dye is 0.21 g. (8% yield), m.p. 260°–261°C. (dec.).

EXAMPLE 10
3-Ethyl-2-(2,3,3a,4,5,6,7,8-octahydro-1H-cyclopenta[e]indolizin-0b 5-ylidenemethyl)benzoselenazolium perchlorate

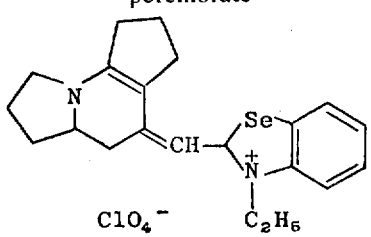

2,3,3a,4,5,6,7,8-Octahydro-1H-cyclopenta[e]indolizin-5-one (0.89 g.) and 3-ethyl-2-methylbenzoselenazolium p-toluene-sulfonate are dissolved in acetic anhydride (15 ml.) and heated at reflux for 3 minutes. The reaction mixture is treated with 1 g. of sodium perchlorate in about 2 ml. of water and chilled. The crude dye is collected on a filter. After one recrystallization from methanol, followed by a water wash and then an ether wash, the yield of purified dye is 0.18 g. (7% yield), m.p. above 320°C.

EXAMPLE 11
2-(1,2,3,4,5,5a,6,7,8,9-Decahydrocyclopenta[e]quinolizin-4-ylidenemethyl)-3-ethylbenzoselenazolium iodide

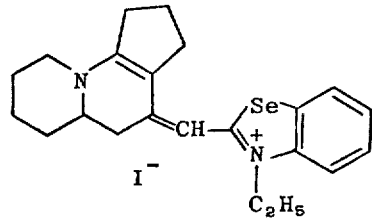

1,2,3,4,5,5a,6,7,8,9-Decahydrocyclopenta[c]quinolizin-4-one (1.91 g.) and 3-ethyl-2-methylbenzoselenazolium p-toluene-sulfonate (3.84 g.) are dissolved in acetic anhydride (15 ml.) and heated at reflux for 2 minutes. The reaction mixture is treated with 2 g. of sodium iodide in about 5 ml. of water and, after chilling, the crude dye is collected on a filter. After one recrystallization from methanol, followed by a water wash and than an ether wash, the yield of purified dye is 0.73 g. (14 % yield), m.p. 302°–303°C. (dec.).

EXAMPLE 12

5-(1,2,3,4,5,5a,6,7,8,0-Decahydrocyclopenta[e]-quinolizin-4-ylidene)-3-[3-(3-pyrrolin-1-yl)propyl]-rhodanine

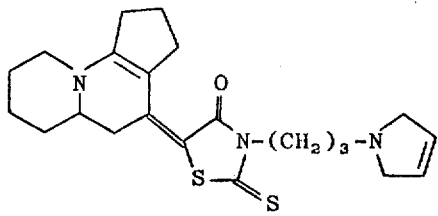

4-Ethoxy-2,3,4,5,5a,6,7,8,9-octahydro-1H-cyclopenta-[c]quinolizinium fluoborate (1.54 g.), 3-[3-(3-pyrrolin-1-yl)propyl]rhodanine perchlorate (1.71 g.) and 1,1,3,3-tetramethylguanidine (1.51 ml.) are dissolved in ethanol and heated at reflux for 5 minutes. After chilling, the crude dye is collected on a filter. After one recrystallization from ethanol containing some tetramethylguanidine, the yield of purified dye is 1.21 g. (58% yield), m.p. 152°–153°C.

EXAMPLE 13

2-(1,2,3,4,5,5a,6,7,8,9-Decahydrocyclopenta[e]-quinolizin-4-ylidenemethyl-3-methylthiazolium perchlorate

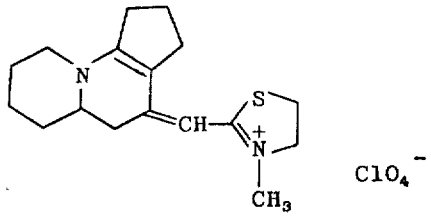

4-Ethoxy-2,3,4,4a,6,7,8,9-octahydro-1H-cyclopenta[c]quinolizinium fluoborate (1.54 g.), 2,3-dimethylthiazolinium iodide (1.22 g.) and triethylamine (1.0 ml.) are dissolved in ethanol (10 ml.) and heated at reflux for 4 minutes. Sodium perchlorate (1.0 g.) is added and the solution is heated at reflux for an additional 2 minutes. After chilling, the crude dye is collected on a filter. After one recrystallization from methanol, the yield of purified dye is 0.52 g. (27% yield), m.p. 224°–225°C. (dec.).

EXAMPLE 14

2-(2,3,4,4a,5,6,7,8,9,10-Decahydro-1H-benzo[e]-quinolizin-6-ylidenemethyl)-3-ethylbenzothiazolium

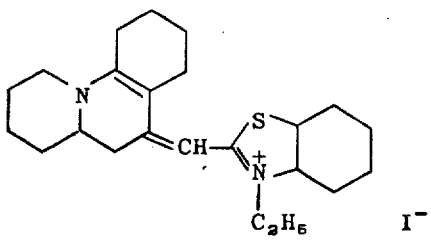

2,3,4,4a,5,6,7,8,9,10-Decahydro-1H-benzo[c-]quinolizin-6one (2.05 g.) and 3-ethyl-2-methylbenzothiazolium iodide are dissolved in acetic anhydride (15 ml.) and heated at reflux for 3 minutes. After chilling, the crude dye is collected on a filter and recrystallized once from methanol. The yield of purified dye is 0.94 g. (19% yield), m.p. 319°–320°C. (dec.).

EXAMPLE 14

2(2,3,4,4a,5,6,7,8,9,10-Decahydro-1H-benzo[e]-quinolizin-6-ylidenemethyl)-1-ethylnaphtho[1,2-d]-thiazolium iodide

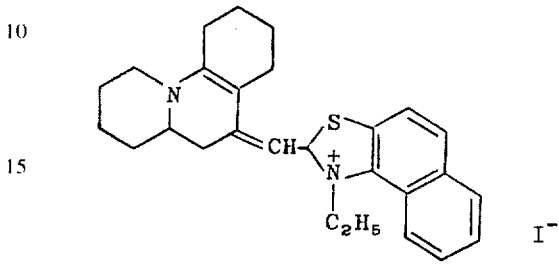

2,3,4,4a,5,6,7,8,9,10-Decahydro-1H-benzo[c]quinolizin 6-one (2.05 g.) and 1-ethyl-2-methylnaptho[1,2-d]thiazolium p-toluenesulfonate are dissolved in acetic anhydride (15 ml.) and heated at reflux for 3 minutes. The reaction mixture is treated with aqueous sodium iodide (2 g. in about 5 ml.) and chilled. The crude dye is collected on a filter and after one recrystallization from methanol the yield of purified dye is 0.41 g. (8% yield), m.p. 244°–245°C. (dec.).

EXAMPLE 16

5-(2,3,4,4a,5,6,7,8,9,10-Decahydro-1H-benzo[e]-quinolizin-6-ylidene)-3-ethylrhodanine

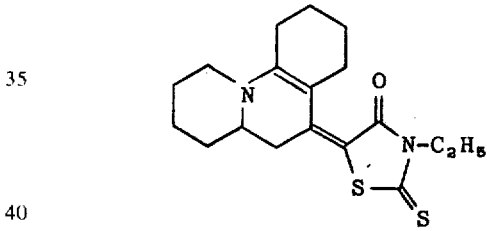

6-Ethoxy-1,2,3,4,4a,5,6,7,8,9,10-Decahydroben-zo[e]-quinolizinium fluoborate (3.21 g.), 3-ethylrhodanine (1.61 g.) and triethylamine (1.5 ml.) are dissolved in ethanol (15 ml.). The reaction mixture is heated at reflux for 5 minutes and chilled. The crude dye is collected on a filter. After one recrystallization from ethanol, the yield of purified dye is 1.79 g. (51% yield), m.p. 153°–155°C.

As used in the structural formulas herein $C_2H_5$ is an ethyl group and $C_6H_5$ is a phenyl group.

The sensitizing effect of the dyes of this invention on negative silver halide emulsions is illustrated by testing the dyes in a sulfur and gold sensitized, cubic-grained gelatino-silver-bromoiodide emulsion containing 2.5 mole percent iodide. The dyes, dissolved in suitable solvents, are added to separate portions of the emulsion at the concentrations indicated in Table I and the emulsions are coated at a coverage of 100 mg. of silver per square foot and 694 mg. of gelatin per square foot on a cellulose acetate film support. A sample of each coating is exposed to a tungsten light source in a sensitometer through a wedge spectrograph and through a continuous step wedge using a Wratten 16 filter (minus blue). Samples are also exposed to the mercury 365 nm. emission line with a mercury lamp through a Wratten 18A filter. The coatings are processed six minutes at about 18°C. in a x-ray developing solution such as Kodak D-19b, fixed, washed and dried. The photographic results from these tests are set forth in Table I.

The speeds are read at 0.3 above fog. The 365 line speeds above 100 indicate chemical sensitization of the dye. The minus blue speeds are compared to the dye of Example 1.

TABLE I

| Dye of Example | Dye Conc. (mg./mole of silver halide) | Rel. Minus Blue Speed | Rel. 365 Line Speed | Fog | Sens. Max. (nm) | Sens. Range (nm) |
|---|---|---|---|---|---|---|
| Control | 0 | — | 100 | .02 | — | to 490 |
| 1 | 200 | 100 | 224 | .03 | 555 | to 595 |
| 2 | 200 | 141 | 224 | .04 | 575 | to 605 |
| 3 | 300 | 115 | 269 | .03 | 560 | to 610 |
| 4 | 200 | 78 | 224 | .02 | 560 | to 600 |
| 5 | 400 | — | 190 | .02 | — | to 500 |
| 6 | 200 | 93 | 218 | .04 | 560 | to 590 |
| 7 | 100 | 85 | 218 | .06 | 565 | to 600 |
| 8 | 200 | 69 | 200 | .04 | 570 | to 600 |
| 9 | 400 | 162 | 200 | .10 | 580 | to 620 |
| 10 | 200 | 81 | 200 | .34 | 560 | to 590 |
| 11 | 216 | 78 | 186 | .05 | 560 | to 590 |
| 12 | 250 | 16 | 68 | .06 | 550 | to 590 |
| 13 | 300 | — | 174 | .02 | 500 | to 530 |
| 14 | 400 | 85 | 224 | .04 | 565 | to 620 |
| 15 | 400 | 105 | 245 | .06 | 580 | to 610 |
| 16 | 400 | 115 | 234 | .06 | 570 | to 610 |

This invention has been described in detail with reference to particular embodiments thereof, but it will be understood that variations and modifications can be effected within the spirit and scope of the invention as described hereinabove and as defined in the appended claims.

I claim:

1. A cyanine or merocyanine dye selected from those having the formulas

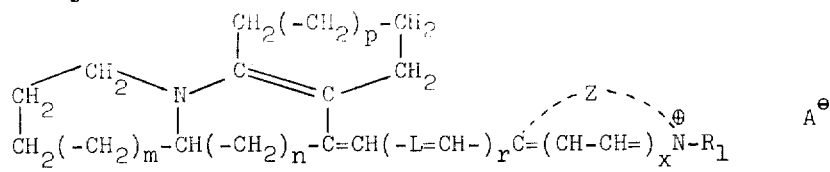

and

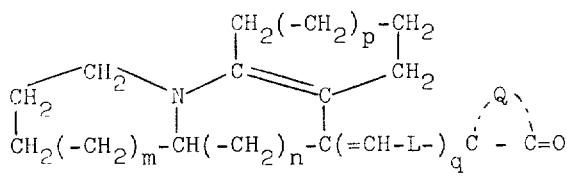

wherein $m$, $n$, $p$ and $x$ each has a value of 0 or 1; $r$ and $q$ each are 0, 1, 2 or 3; L represents a methine group; Z represents the nonmetallic atoms necessary to complete a heterocyclic nucleus selected from the group consisting of benzothiazole, naphthothiazole, thionaphtheno-7', 6', 4,5-thiazole, oxazole, benzoxazole, naphthoxazole, selenazole, naphthoselenazole, thiazoline, 2-quinoline, 4-quinoline, 1-isoquinoline, 3,3-dialkylindolenine, 2-pyridine, 4-pyridine, imidazole, benzimidazole, naphthimidazole and lepidine; $R_1$ represents lower alkyl, carboxyalkyl, sulfoalkyl, hydroxyalkyl, alkoxyalkyl, sulfoalkoxyalkyl and phenyl; A represents an anion and Q represents the nonmetallic atoms necessary to complete a heterocyclic nucleus selected from the group consisting of 2-pyrazolin-5-one, indandione, 2,4,6-triketo-hexahydropyrimidine, 2,6-diketo-4-thiohexahydropyrimidine, rhodanine, hydantoin and thiohydantoin.

2. 1-Ethyl-2-(1,2,3,4,5,5a,6,7,8,9-decahydrocyclopenta-[c]quinolizin-4-ylidenemethyl)-naphtho[1,2-d]thiazolium iodide.

3. 2-(1,2,3,4,5,5a,6,7,8,9,-Decahydrocyclopenta[c]-quinolizin-4-ylidenemethyl)-3-ethyl-5-methoxybenzothiazolium perchlorate.

4. 2(2,3,4,4a,5,6,7,8,9,10-Decahydro-1H-benzo[e]-quinolizin-6-ylidenemethyl)-3-ethylbenzothiazolium iodide.

5. 2-(2,3,4,4a,5,6,7,8,910-Decahydro-1H-benzo[e]-quinolizin-6-ylidenemethyl)-1-ethylnaptho[1,2-d]thiazolium iodide.

6. 5-(2,3,4,4a,5,6,7,8,9,10-Decahydro-1H-benzo[e]-quinolizin-6-ylidene)-3-ethylrhodanine.

7. A dye selected from the group consisting of 3-ethyl-2-(1,2,3,4,5,5a,6,7,8,9-decahydrocyclopenta[c]-quinolizin-4-ylidenemethyl)benzothiazolium iodide;

5-(1,2,3,4,5,5a,6,7,8,9-decahydrocyclopenta[c]quinolizin-4-ylidene)-3-ethylrhodanine;

4-(1,2,3,4,5,5a,6,7,8,9-decahydrocyclopenta[c]quinolizin-4-ylidene)-3-methyl-1-phenyl-2-pyrazolin-5-one;

3-ethyl-2-(2,3,3a,4,5,6,7,8-octahydro-1H-cyclopenta[e]-indolizin-5-ylidenemethyl)benzothiazolium iodide;

3-ethyl-5-(2,3,3a,4,5,6,7,8,-octahydro-1H-cyclopenta[e]-indolizin-5-ylidene)rhodanine;

2-(2,3,4,4a,5,6,7,8,9,10-decahydro-1H-benzo[c]quinolizin-6-ylidenemethyl)-3-ethylnaptho[2,3-d]thiazolium fluoborate;

1-ethyl-2-(2,3,3a,4,5,6,7,8-octahydro-1H- cyclopenta[e]-indolizin-5-ylidenemethyl)naphtho[1,2-d]thiazolium iodide;

3-ethyl-2-(2,3,3a,4,5,6,7,8-octahydro-1H-cyclopenta-indolizin-5-ylidenemethyl)benzoselenazolium perchlorate;

2-(1,2,3,4,5,5a,6,7,8,9-decahydrocyclopenta[e quinolizin4-ylidenemethyl)-3-ethylbenzoselenazolium iodide;

5-(1,2,3,4,5,5a,6,7,8,9-decahydrocyclopenta quinolizin-4-ylidene)-3-[3-(3-pyrrolin-1-yl)propyl]rhodanine; and 2-(1,2,3,4,5a,6,7,8,9-decahydrocyclopenta[e quinolizin-4-ylidenemethyl-3-methylthiazolium perchlorate.

* * * * *